US007766408B2

(12) United States Patent
Lota et al.

(10) Patent No.: US 7,766,408 B2
(45) Date of Patent: Aug. 3, 2010

(54) FORWARD/REARWARD SLIDING ARMREST

(75) Inventors: Charan Singh Lota, Canton, MI (US);
Joel T. Runyan, Wayne, MI (US); Eiji Fukushima, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 144 days.

(21) Appl. No.: 11/971,613

(22) Filed: Jan. 9, 2008

(65) Prior Publication Data

US 2009/0174236 A1     Jul. 9, 2009

(51) Int. Cl.
*B60R 11/00* (2006.01)

(52) U.S. Cl. .................. 296/37.1; 296/37.8; 296/24.34; 297/411.35; 297/115

(58) Field of Classification Search ............... 296/1.09, 296/24.34, 37.1, 37.8; 297/411.2, 411.32, 297/411.35, 411.37, 115–117, 188.14; 220/315, 220/811, 812, 813
See application file for complete search history.

(56) References Cited

U.S. PATENT DOCUMENTS

| | | | |
|---|---|---|---|
| 6,045,173 A | 4/2000 | Tiesler et al. | |
| 6,129,237 A | 10/2000 | Miyahara et al. | |
| 6,244,648 B1 * | 6/2001 | Gackstatter | 296/37.8 |
| 6,419,314 B1 | 7/2002 | Scheerhorn | |
| 6,719,367 B2 | 4/2004 | Mic et al. | |
| 6,932,402 B2 | 8/2005 | Niwa et al. | |
| 7,029,049 B2 * | 4/2006 | Rockafellow et al. | 296/37.8 |
| 2006/0097532 A1 | 5/2006 | Adams et al. | |
| 2006/0131910 A1 | 6/2006 | Cowelchuk et al. | |
| 2006/0279123 A1 | 12/2006 | Bazinski et al. | |

* cited by examiner

*Primary Examiner*—Glenn Dayoan
*Assistant Examiner*—Melissa A Black
(74) *Attorney, Agent, or Firm*—Gifford, Krass, Sprinkle, Anderson & Citkowski, P.C.

(57) ABSTRACT

A forward/rearward slidable and upwardly pivotable armrest supported upon an open center console. Retractable pins associated with inner underside locations of the armrest are displaced upon actuation of a lever component associated with the armrest, and which selectively reseats the armrest at linear travel locations along first and second rails defined upon the side walls of the console. Seating locations established between a slidable and upper support portion of the armrest and the recessed stops defined along inwardly facing surfaces of the rails permit the armrest to be translated to either forward or rearward locations of a center nominal position, relative to a fixed lower carriage with pivot support bracket.

15 Claims, 4 Drawing Sheets

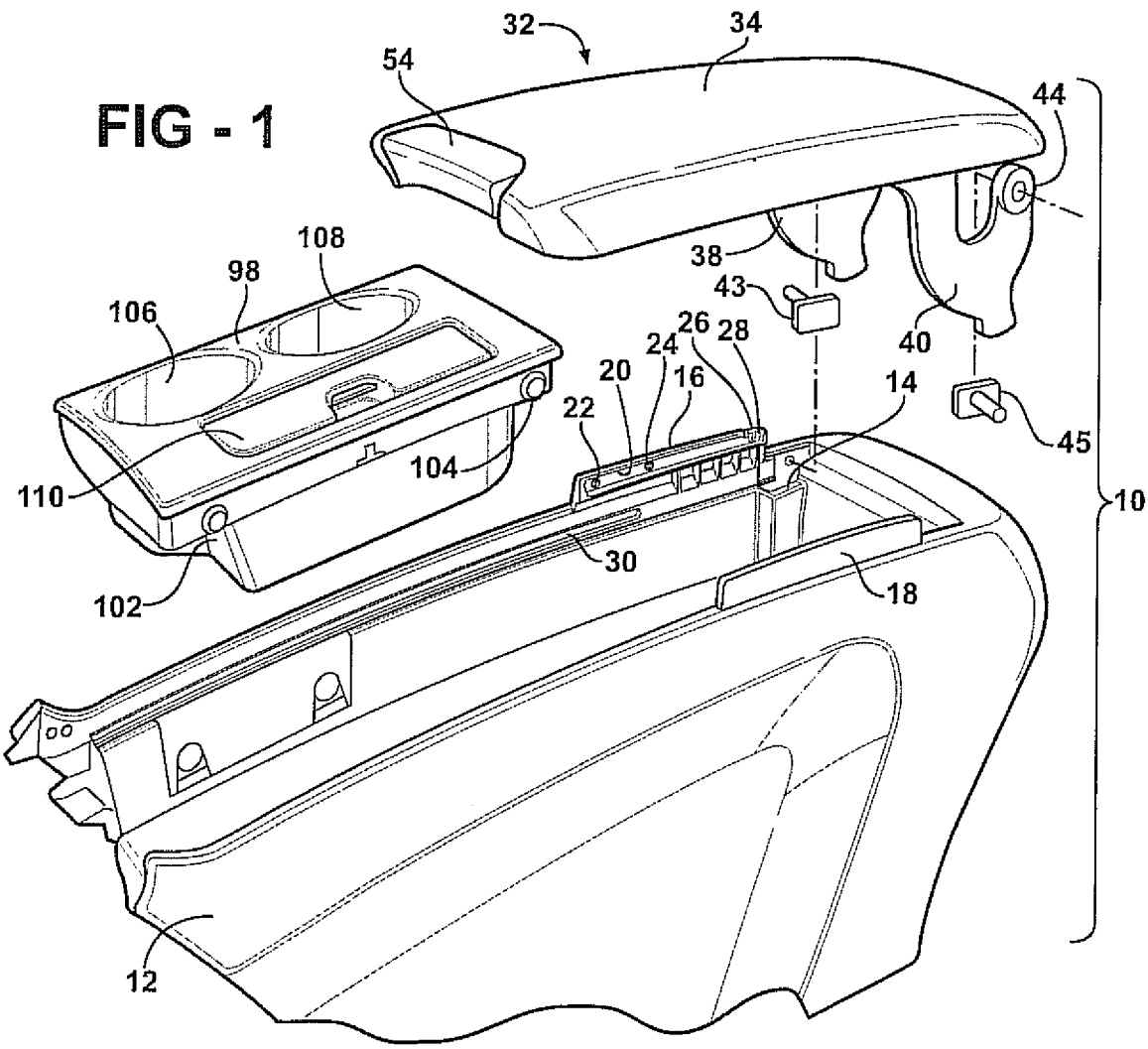
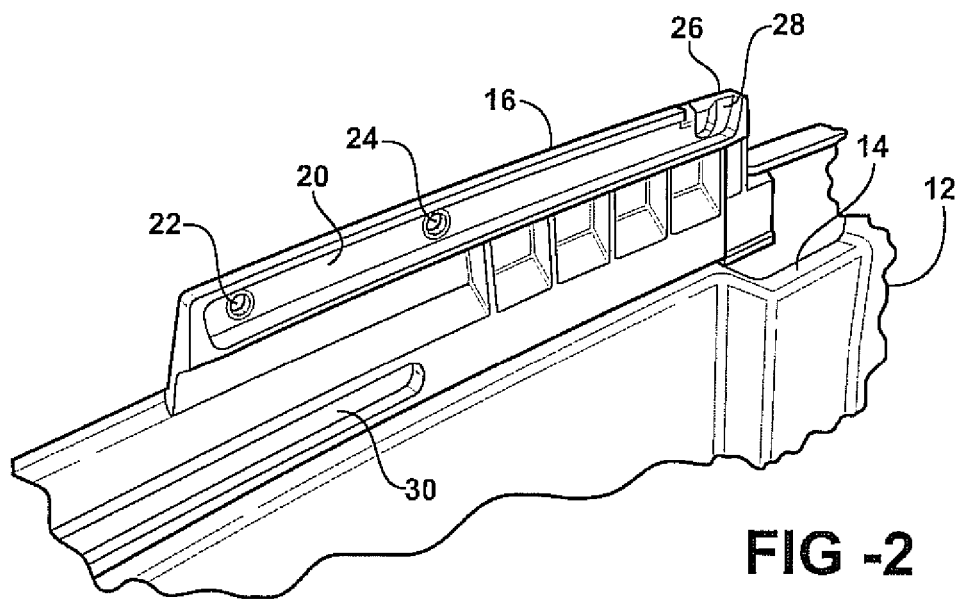

FORWARD/REARWARD SLIDING ARMREST

FIELD OF THE INVENTION

The present invention relates generally to vehicle center console assemblies. More specifically, the present invention discloses a forward/rearward slidable and upwardly pivotable armrest supported upon an open center console. Retractable pins associated with inner underside locations of the armrest are displaced upon actuation of a lever component associated with the armrest, and which selectively reseats the armrest at linear travel locations along first and second rails defined upon the side walls of the console.

BACKGROUND OF THE INVENTION

Vehicle console assemblies are known in the art, such as having a sliding armrest that is pivotably attached so that the armrest can be lifted to reveal a storage compartment. A number of such assemblies disclose a slidable armrest pivotably attached to a vehicle console that can move between nominal and forward positions.

The prior art also teaches, at most, rail systems incorporating recessed channels or slots defined in a center console assembly and wherein a retainer is inserted into the channels with a slidable hinge movable along the rail. Accordingly, a user is not able to pivot the armrest until the armrest is placed fully to a rearmost nominal position.

SUMMARY OF THE INVENTION

The present invention discloses a forward/rearward slidable and upwardly pivotable armrest supported upon an open center console. The armrest has an upper support linearly displaceable relative to a fixed lower carriage with a pivot support bracket. The center console is further defined by a bin secured to a floor of the vehicle and exhibiting an open top and interior configuration within which said bracket seats in order to permit said armrest to pivot between open and closed positions with said bin.

Retractable pins associated with inner underside locations of the armrest are displaced upon actuation of a lever component and interconnecting linkage associated with the armrest. The pins selectively reseat the armrest at linear travel locations, both forward and rearward of a central nominal position, and in order to establish at least three-position adjustability. First and second rails extend in both upwardly projecting and linearly fashion, relative to the side walls of the console and to which the armrest is slidably engaged.

BRIEF DESCRIPTION OF THE DRAWINGS

Reference will now be made to the attached drawings, when read in combination with the following detailed description, wherein like reference numerals refer to like part throughout the several views, and in which:

FIG. 1 is an exploded view of the sliding armrest and center console assembly, with associated and insertable support tray according to the present inventions;

FIG. 2 is an enlarged partial view of a selected and upwardly extending rail associated with the center console;

DETAILED DESCRIPTION OF THE PREFERRED EMBODIMENTS

Figure 4:
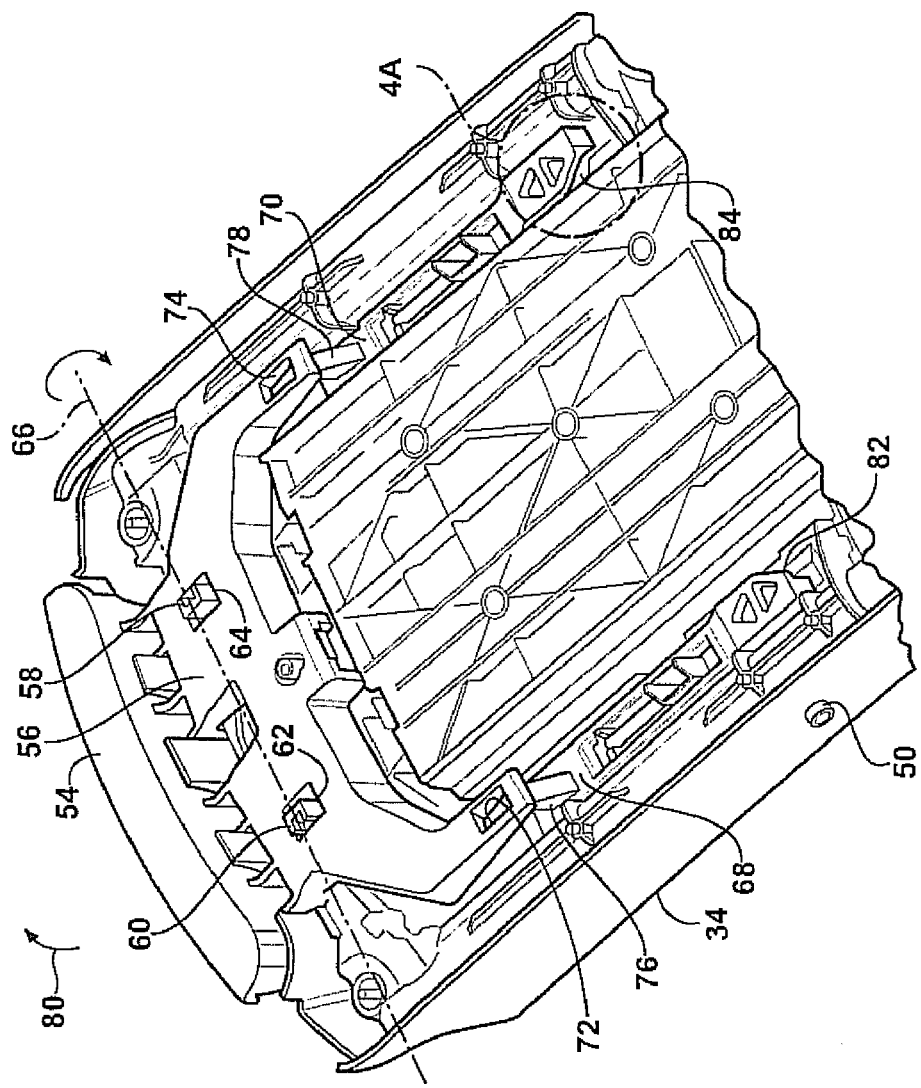
FIG. 4 is a rotated underside perspective of the armrest and illustrating the linkage established between the lever and inwardly retractable pins associated with the inner underside locations of the armrest.

Referring now to FIG. 1, an exploded view is illustrated at 10 of a center console assembly according to the present inventions. A bin 12 is secured to a floor of the vehicle and, as again best shown in FIG. 1, exhibits an open top and interior configuration. The center console bin is typically constructed of a durable polymer or other suitable material and can include either a metal or plastic shell or inner lining.

As best shown in FIG. 1, an open and interior elongated configuration of the bin 12 includes inwardly and rearwardly most projecting support locations (see for example as shown at 14 in FIGS. 1 and 2, the other support location being hidden from view). As will be subsequently described, the support locations provide additional seating and pivoting support to a corresponding armrest subassembly supported over the bin 12.

Additional features associated with the bin 12 include a pair of upwardly projecting and linearly extending rails 16 and 18 extending along first and second top sides of the bin. The rails 16 and 18 are illustrated as being located along a rearmost extending range of the bin sides however it is also envisioned that the rails can be repositioned forwardly relative to the bin. Opposing and inwardly facing tracks are defined within each of the rails 16 and 18, such as again by example referenced by selected track 20 in corresponding rail 16 in FIGS. 1 and 2.

A plurality of recess apertures, illustrated at forward-most location 22, nominal location 24 and rearward-most location 26 (again in reference to rail 16 in FIGS. 1 and 2) establish three-position adjustability along the associated track 20. An additional rail feature also includes a rearmost positioned and top edge communicating chamfer, see at 28 in proximity to the rearward most seating aperture 26 and at a rearward end of the associated inner seating track 20. Additional parallel extending and interior recessed support channels (see for example at 30 in each of FIGS. 1 and 2) are defined within the bin side extending interior for purposes as will be subsequently described.

Figure 3:
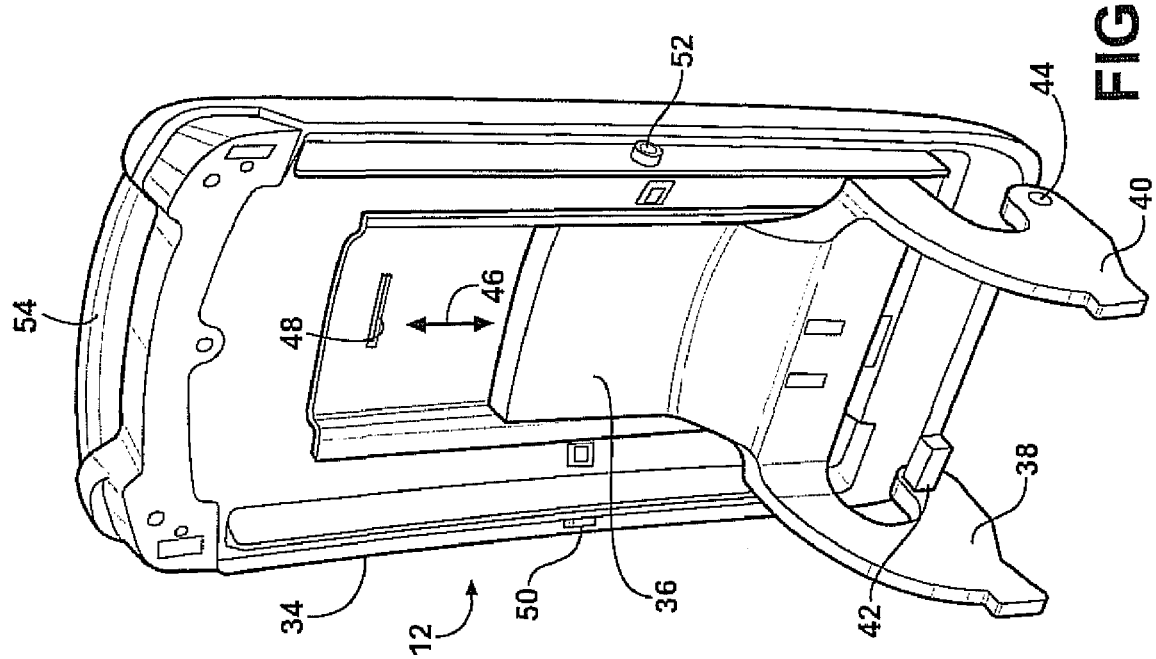
FIG. 3 is an underside perspective of the armrest shown in FIG. 1 and illustrating the linearly displaceable feature of the upper support relative to the fixed lower carriage with pivot support bracket.

Referring initially again to FIG. 1 and to FIG. 3, an armrest subassembly is generally referenced at 32 and has an upper, generally planar surface shaped support 34 linearly displaceable relative to a fixed lower carriage with a pivot support bracket 36 by from which extend first 38 and second 40 integrally formed flange portions, upon outward facing rear edges of which are configured pivotal support collars 42 and 44, respectively. Upon installation, the associated flange 38 and 40 and pivotal collar 42 and 44 portions seat upon the inwardly and rearwardly most projecting support locations, again for example at 14, in order to permit the armrest 32 to pivot between open (FIG. 3) and closed (see FIG. 5 cutaway) positions with the bin 12. Pins 43 and 45 (FIG. 1) are provided for seating the pivot collars 42 and 44 in location upon the corresponding inner bin ledge supports (at 14).

As further best shown in the underside perspective of FIG. 3, the armrest support 34 is permitting to linearly displace a selected range, see arrow 46, relative to the fixed carriage 36 and along an underside recess established between the slidable 34 and fixed 36 components of the armrest. It is also envisioned that the support 34, in addition to being slidable along the range defined at 46, can be releasably securable to the carriage 36 at selected locations corresponding to the rail defined seating locations 22, 24 and 26, and such as which can include underside configured seating slots (at 48 in FIG. 3) or the like.

Retractable pins see at 50 and 52, are associated with underside and lateral/side extending locations of the armrest support 34. As will be described, the purpose of the pins 50 and 52 is to seat within the tracks 20, via the entry chamfers 28 configured within the inwardly and opposingly facing surfaces of the rails 16 and 18, and to readjust the slidable armrest support 34 between the forward 22, nominal 24 and rearward 26 positions corresponding to the pair of rearwardly situated rails.

As will be described in reference to FIGS. 4, 4A and 4B, the pins 50 and 52 are concurrently being displaced upon actuation of a lever extending from a forward location of the armrest support 34 and interconnecting linkages associated with the pins 50 and 52, to seatingly engage with the selected locations 22, 24 and 26 along the rails 16 and 18 and within their associated tracks 20. FIG. 4 is a rotated underside and cutaway perspective of the slidable armrest support 34 (with portions of the underside and side extending fascia removed for ease of illustration) and showing the linkages established between the forward disposed lever and the inwardly retractable pins 50 and 52 associated with the inner underside locations of the armrest.

The lever as referenced includes a forward-most extending grasping portion 54 and an interiorly extending, typically integrally formed, supported bracket 56 exhibiting a widthwise pivot location, see seating locations 58 and 60 for fixed supports associated with the inner architecture of the armrest 34 and which extend through recesses 62 and 64 in the bracket 56 in order to rotated the bracket about widthwise extending axis 66.

The bracket 56 terminates at interior displacement inducing locations with first and second link arms 68 and 70 associated with the linkages and interconnecting the lever grasping portion 54 with the pins 50 and 52.

The interior displacement inducing locations associated with the lever bracket 56 further include interior window portions 72 and 74, through which seat upwardly extending and angled ramps, at 76 and 78 respectively, associated with forward locations of the link arms 68 and 70. Rotation of the lever (via actuation of the grasping portion 54 along direction 80 and connected bracket 56 causes the angled ramps 76 and 78 to be coacted against the window portions 72 and 74 associated with the terminating ends of the bracket 56, and such that the downward pivoting of the bracket windows 72 and 74 cause the link arms 68 and 70 to forwardly displace along inner and lengthwise seating tracks defined within the armrest interior architecture.

Figure 4A:
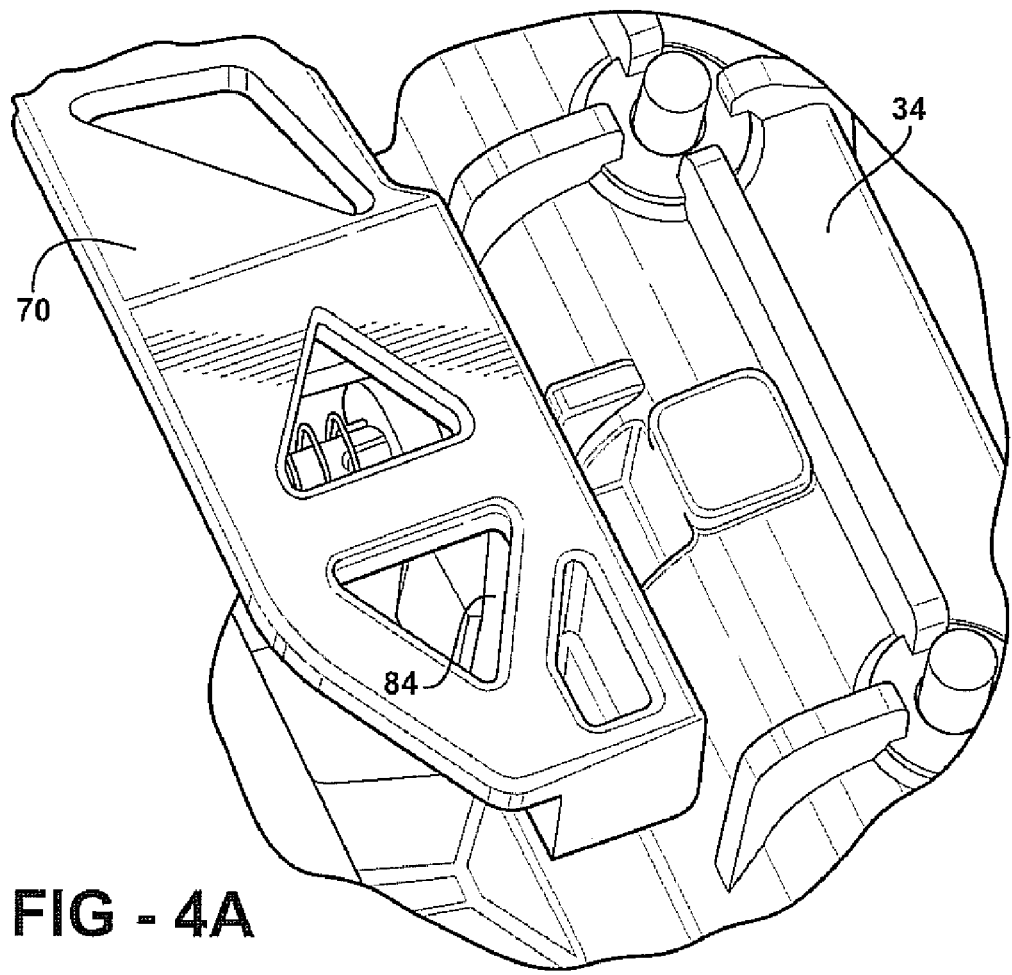
FIG. 4A is an enlarged sectional taken about area 4A-4A in FIG. 4 and illustrating a remote end configuration of an associated link arm for selectively actuating a corresponding retracting pin.
Figure 4B:
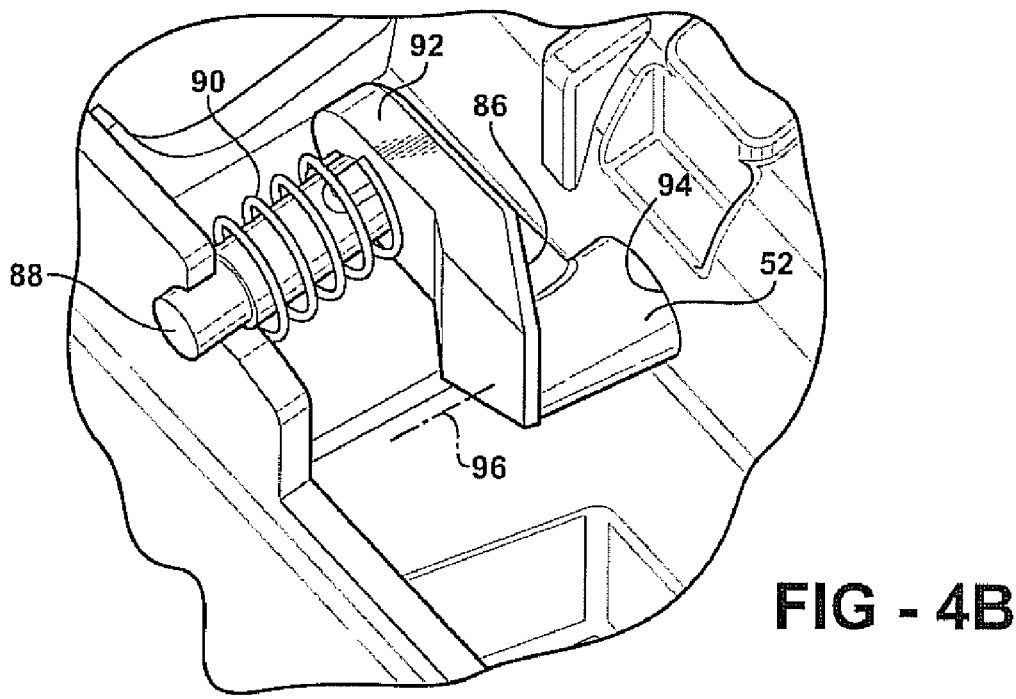
FIG. 4B is a further sectional view with the link arm removed and illustrating the spring biased lock pin along with its mating shoulder configuration which is co-acted upon by the forwardly displacing link arm in order to retract from an associated rail location.

Referring to FIG. 4A an enlarged sectional taken about area 4A-4A in FIG. 4 illustrates a remote end configuration of an associated link arm 70 for selectively actuating the corresponding retracting pin 52 (FIG. 4B). The rear end location of each link arm further exhibits inwardly angled surfaces (see as shown in FIG. 4 at 82 and 84 for link arms 68 and 70, as well as only at 84 in the enlarged illustration of FIG. 4A).

The retractable pins 50 and 52, and as best illustrated by selected pin 52 in FIG. 4B, each further include an interior body exhibiting mating angled surfaces 86, upon which the associated link arm angled surfaces (at 84 in FIG. 4A for link arm 70) coact during forward displacement. As also best illustrated in FIG. 4B (with the link arm removed) a spring bias applied to the lock pin 52 includes an interiorly supported, spring biased and displaceable stem 88 (with encircling coil spring 90) extending from its interior body (see further at 92 and upon which is configured the angled mating surface 86 for the selected pin subassembly 52).

The locking portion of the pin, again at 52, extends from an opposite, outward directed location, through a configured side aperture 94 in the armrest support 34 interior for engaging a designated location along the rails 16 and 18. The pin is normally biased in an outward seating direction, however actuation of the handle grasping portion, and consequent retraction of the pins, occurs along the directional indicator 96 in FIG. 4B.

As previously described, and upon assembly, the pins 50 and 52 selectively seating along at least forward, nominal and rearward locations defined along opposing and inwardly facing tracks associated with the rails 16 and 18, and in order to establish three-position adjustability. While not shown, it is also envisioned that the rails 16 and 18 can include any number of forward and rearward adjustable locations, not limited to the three disclosed in the embodiment illustrated.

Also, and while the forward, nominal and rearward locations each are exhibited by a recess aperture defined along the inwardly facing tracks at the engaging locations, it is also envisioned that other configurations or structures can be substituted for releasably securing the pins at selected displacing locations. Further, and again referencing the FIG. 3 underside perspective of the armrest 32 in combination with that shown in FIG. 1, it is evident from the positioning of the armrest support 34 relative to the rearward end of the bin 12 that any rearward displacement of the support 34, relative to the fixed carriage bracket 36, and from the forward-most position shown, will result in slidable support 34 extending over the rear edge of the bin 12. As such, the architecture disclosed will thereby not interfere with the moment of pivot of the associated flange components 38 and 40 of the armrest support bracket, as supported within the bin 12, between the open and closed positions, and due to the fact that a rearwardly translated arrest support 34 will achieve an overhang position relative to the rear of the bin 12.

Figure 5:
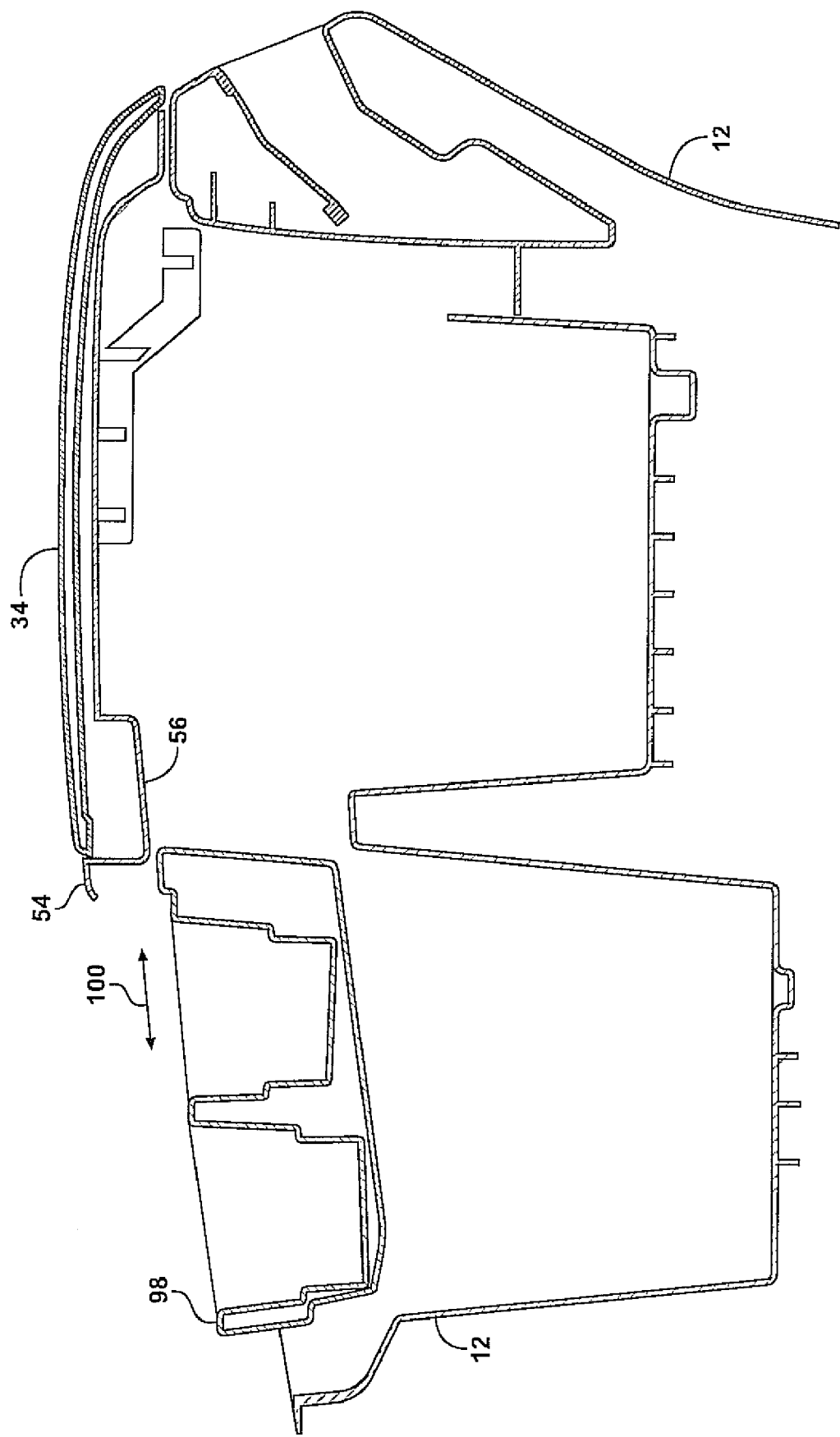
FIG. 5 is a lengthwise cutaway of an assembled configuration of armrest, tray and console and illustrating the slidable aspect of the armrest in non-contacting fashion with the interiorly seated tray.

Referring finally to FIG. 5, a lengthwise cutaway is shown of an assembled configuration of the armrest 34 along with a (cup holding and storage compartment providing) tray 98, both of which are seated within the open interior of the console bin 12. The purpose of FIG. 5 is to illustrate the slidable aspect of the armrest support 34, in non-contacting fashion with the interiorly seated tray 98, as referenced along bi-directional arrow 100.

The tray 98, as shown in FIG. 1, includes side disposed and seating projections (see at 102 and 104 along one visible side of the tray) engaging with the additional parallel extending and interior recessed support channels (referenced by selected channel 30 defined within an opposite and likewise visible side of the bin). Upon seating the tray 98 (which again can include cup holding portions 106 and 108, as well as a portable storage stray 110) within the bin support channels 30 the linearly displaceable upper armrest support 34 establishes a clearance with the edge of the inserted tray 98.

Having described our invention, other and additional preferred embodiments will become apparent to those skilled in the art to which it pertains and without deviating from the scope of the appended claims.

We claim:

1. A center console assembly, comprising:
an armrest having an upper support linearly displaceable relative to a lower carriage with a pivot support bracket;
a bin mounted to the vehicle, said bin having an open top and a pair of sides, said lower carriage mounted to said bin, so that said armrest may pivot between open and closed positions relative said bin;

a lever mounted to the armrest for selectively moving pins into and out of engagement with one of forward, nominal and rearward pin seating locations defined in opposing tracks extending along top sides of said bin for permitting said armrest to displace forward and rearwardly relative said bin;

said lever further comprising a forward-most extending grasping portion and an interiorly supported bracket exhibiting a widthwise pivot location, said support bracket terminating at interior displacement inducing locations with first and second link arms associated with linkages interconnecting said lever with said pins; and said interior displacement inducing locations associated with said support bracket further comprising interior window portions, through which seat upwardly extending and angled ramps associated with forward locations of said link arms, rotation of said lever and support bracket causing said angled ramps to coact against said window portions and said link arms to forwardly displace.

2. The assembly as described in claim 1, further comprising said tracks being associated with a pair of upwardly projecting and linearly extending rails along said top sides of said bin.

3. The assembly as described in claim 1, rear end locations of said link arms further comprising inwardly angled surfaces, said retractable pins each further comprising an interior body exhibiting mating angled surfaces upon which said link arms coact during forward displacement.

4. The assembly as described in claim 3, said retractable pins each further comprising an interiorly supported, spring biased and displaceable stem extending from said interior body, a locking portion extending from an opposite, outward directed location for engaging said rail.

5. The assembly as described in claim 1, said forward, nominal and rearward locations each further comprising a recess aperture defined along said inwardly facing track at an engaging location.

6. The assembly as described in claim 1, further comprising an underside recess defined in said armrest upper support and within which is supported a linearly displaceable seating portion associated with said lower carriage, said pivot support bracket extending from said carriage seating portion.

7. The assembly as described in claim 1, each of said rails further comprising a rearmost positioned and top edge communicating chamfer for installing said pins therethrough and to seat said armrest upon said bin and within each of said opposing tracks.

8. The assembly as described in claim 2, each of said rails extending along a rear most region of said bin, additional parallel extending and interior recessed support channels defined within said bin being engaged by opposite support edges associated with an insertable tray, said linearly displaceable upper armrest support establishing a clearance with and translating over a top edge of said inserted tray.

9. The assembly as described in claim 1, said interior configuration of said bin further comprising inwardly and rearwardly most projecting support locations for seating thereupon first and second collars associated with said pivot support bracket, a pin inserting through each of said collars and seating within an inner surface of said bin approximate said support location to secure said fixed lower carriage within said bin.

10. A center console assembly, comprising:

an armrest having a specified shape and size and including an exterior facing side and an under side exhibiting side disposed and retractable pins;

a bin secured to a floor of the vehicle and exhibiting an open top communicating with an interior recess; and a pair of upwardly projecting and linearly extending rails along first and second top sides of said bin and between which said pins are seated, each of said rails extending along a rear most region of said bin, additional parallel extending and interior recessed support channels defined within said bin being engaged by opposite support edges associated with an insertable tray, a linearly displaceable upper armrest support establishing a clearance with and translating over a top edge of said inserted tray, said pins being displaced upon actuation of a lever associated with said armrest to seatingly engage with selected locations along said rails.

11. The console assembly as described in claim 10, said armrest further comprising said upper support linearly displaceable relative to a fixed lower carriage with a pivot support bracket; said bin further comprising support locations for seating thereupon said pivot support bracket to permit said armrest to independently linearly displace upon said bin while pivoting between open and closed positions with said bin.

12. The console assembly as described in claim 10, said pins selectively seating along at least forward, nominal and rearward recessed aperture locations defined along opposing and inwardly facing tracks associated with said rails, and in order to establish three-position adjustability.

13. The assembly as described in claim 11, further comprising an underside recess defined in said armrest upper support and within which is supported a linearly displaceable seating portion associated with said fixed lower carriage, said pivot support bracket extending from said carriage seating portion.

14. The assembly as described in claim 12, each of said rails further comprising a rearmost positioned and top edge communicating chamfer for installing said pins therethrough and to seat said armrest upon said bin and within each of said inwardly facing rail tracks.

15. A center console assembly, comprising:

an armrest having a specified shape and size and including an exterior facing side and an under side exhibiting side disposed and retractable pins;

a bin secured to a floor of the vehicle and exhibiting an open top communicating with an interior recess; and a pair of upwardly projecting and linearly extending rails along first and second top sides of said bin and between which said pins are selectively seated along at least forward, nominal and rearward recessed aperture locations defined along opposing and inwardly facing tracks associated with said rails, and in order to establish three-position adjustability, each of said rails further including a rearmost positioned and top edge chamfer for installing said pins therethrough and to seat said armrest upon said bin and within each of said inwardly facing rail tracks, said pins being displaced upon actuation of a lever associated with said armrest to seatingly engage with selected locations along said rails.

* * * * *

UNITED STATES PATENT AND TRADEMARK OFFICE
CERTIFICATE OF CORRECTION

PATENT NO. : 7,766,408 B2  Page 1 of 1
APPLICATION NO. : 11/971613
DATED : August 3, 2010
INVENTOR(S) : Charan Singh Lota et al.

It is certified that error appears in the above-identified patent and that said Letters Patent is hereby corrected as shown below:

Column 2 line 58 delete "by"

Column 4 line 38 replace "arrest" with --armrest--

Signed and Sealed this

Sixteenth Day of November, 2010

David J. Kappos
*Director of the United States Patent and Trademark Office*